United States Patent
Kang et al.

(10) Patent No.: US 10,501,204 B2
(45) Date of Patent: Dec. 10, 2019

(54) 3-AXIS ADJUSTABLE SMALL GIMBAL

(71) Applicant: Samsung Electronics Co., Ltd., Suwon-si, Gyeonggi-do (KR)

(72) Inventors: Yoon-Seok Kang, Seoul (KR); Sungjin Park, Suwon-si (KR); Baeseok Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/773,066

(22) PCT Filed: Aug. 19, 2016

(86) PCT No.: PCT/KR2016/009137
§ 371 (c)(1),
(2) Date: May 2, 2018

(87) PCT Pub. No.: WO2017/078254
PCT Pub. Date: May 11, 2017

(65) Prior Publication Data
US 2018/0319512 A1    Nov. 8, 2018

(30) Foreign Application Priority Data

Nov. 2, 2015 (KR) .......................... 10-2015-0153073

(51) Int. Cl.
*G03B 39/00*     (2006.01)
*B64D 47/08*     (2006.01)
(Continued)

(52) U.S. Cl.
CPC .............. *B64D 47/08* (2013.01); *B64C 39/02* (2013.01); *F16M 11/12* (2013.01);
(Continued)

(58) Field of Classification Search
USPC ............................................................. 396/12
See application file for complete search history.

(56) References Cited

U.S. PATENT DOCUMENTS 3,064,547 A * 11/1962 Humphries ............ F16M 11/10
                                                             352/243
3,765,631 A * 10/1973 Herbst ................. F16M 11/123
                                                             248/583
(Continued)

FOREIGN PATENT DOCUMENTS

CA        2 340 897 A1     9/2002
JP        H02-80907 A      3/1990
(Continued)

OTHER PUBLICATIONS

Extended European Search Report dated Aug. 28, 2018, issued in European Application No. 16862273.6.
(Continued)

*Primary Examiner* — Rodney E Fuller
(74) *Attorney, Agent, or Firm* — Jefferson IP Law, LLP

(57) ABSTRACT

A 3-axis camera gimbal is disclosed in the present disclosure. The disclosure gimbal may include: a first supporting body; a lens barrel including a lens group and coupled to the first supporting body in a rotatable manner about a first axis; a rolling driving unit mounted at a first position of the lens barrel to provide force for rotating the lens group about a second axis perpendicular to the first axis; a pitching driving unit mounted to the first supporting body to provide force for rotating the lens barrel about the first axis; a second supporting body coupled to the first supporting body in a rotatable manner about a third axis perpendicular each of to the first and second axes; and a yawing driving unit mounted to the second supporting body to allow the first supporting body to rotate about the third axis. Various embodiments are also possible.

12 Claims, 14 Drawing Sheets

(51) Int. Cl.
  *B64C 39/02* (2006.01)
  *F16M 11/12* (2006.01)
  *F16M 13/02* (2006.01)
  *G03B 17/56* (2006.01)
  *G03B 15/00* (2006.01)

(52) U.S. Cl.
  CPC .......... *F16M 11/123* (2013.01); *F16M 13/02* (2013.01); *G03B 15/006* (2013.01); *G03B 17/56* (2013.01); *G03B 17/561* (2013.01); *B64C 2201/127* (2013.01)

(56) References Cited

U.S. PATENT DOCUMENTS

| | | | |
|---|---|---|---|
| 4,498,038 A | 2/1985 | Malueg | |
| 5,897,223 A | 4/1999 | Tritchew et al. | |
| 6,708,943 B2 | 3/2004 | Ursan et al. | |
| 7,000,883 B2* | 2/2006 | Mercadal | F16M 11/10 248/660 |
| 7,534,057 B2 | 5/2009 | Jones et al. | |
| 7,985,030 B1 | 7/2011 | Chou | |
| 9,280,038 B1* | 3/2016 | Pan | G03B 17/561 |
| 2004/0173726 A1* | 9/2004 | Mercadal | F16M 11/10 248/660 |
| 2005/0018074 A1* | 1/2005 | Nakamoto | H04N 5/2259 348/375 |
| 2009/0160951 A1 | 6/2009 | Anderson et al. | |
| 2013/0314502 A1 | 11/2013 | Urbach et al. | |
| 2014/0037278 A1 | 2/2014 | Wang | |
| 2016/0337562 A1* | 11/2016 | Kang | H04N 5/2254 |
| 2016/0352992 A1* | 12/2016 | Saika | H04N 5/2328 |
| 2017/0048439 A1* | 2/2017 | von Borcke-Morawitz | G01C 21/18 |
| 2017/0198747 A1* | 7/2017 | Chen | B64D 47/08 |
| 2017/0291719 A1* | 10/2017 | Lavine | B64C 39/024 |
| 2018/0135798 A1* | 5/2018 | Griffin | F16M 13/02 |
| 2018/0149949 A1* | 5/2018 | Kim | F16M 11/06 |
| 2018/0274720 A1* | 9/2018 | Gubler | F16M 13/02 |

FOREIGN PATENT DOCUMENTS

| | | |
|---|---|---|
| JP | 2005045453 A | 2/2005 |
| JP | 2009134795 A | 6/2009 |
| JP | 2010039350 A | 2/2010 |
| KR | 10-1068722 B1 | 9/2011 |
| KR | 10-1090015 B1 | 12/2011 |
| KR | 10-2012-0082728 A | 7/2012 |
| KR | 10-1363066 B1 | 2/2014 |
| KR | 20-0472290 Y1 | 4/2014 |
| KR | 10-2014-0082695 A | 7/2014 |
| KR | 10-1412551 B1 | 7/2014 |
| KR | 10-2016-0134316 A | 11/2016 |
| WO | 2015/162247 A1 | 10/2015 |

OTHER PUBLICATIONS

European Office Action dated Sep. 18, 2019, issued in a counterpart European application No. 16862273.6-1022.

* cited by examiner

3-AXIS ADJUSTABLE SMALL GIMBAL

TECHNICAL FIELD

Various embodiments of the present disclosure relate to a capturing instrument which adjusts 3 axes so that a camera maintains a horizontal posture.

BACKGROUND ART

A capturing instrument for maintaining a horizontal posture (hereinafter, referred to as a gimbal) according to the conventional technique has been designed in general to support a two-axis adjustment and a 3-axis adjustment. The number of driving units is determined depending on the number of adjustment axes. A vertical Z-axis rotation may be defined as yawing. An X-axis adjustment may be defined as pitching. A Y-axis adjustment may be defined as rolling.

Each axis has a driving unit which operates to maintain a horizontal posture. In each step, a rotation axis is associated with a next axial rotation. When the Z-axis rotates, driving units and constructions of the X- and Y-axes also rotate at the same time. When the Y-axis rotates, a construction of the X-axis rotates together. The X-axis is configured such that only constructions related to the X-axis rotate.

In the conventional technique, an additional camera is designed to be mounted to a gimbal, and the camera is fixedly mounted to an end of the X-axis which is a last rotation axis.

A gimbal to be mounted to a large camera may have an axis support at both ends thereof. However, a gimbal for a small camera uses a portion in which a driving unit exists as a rotation axis.

According to the conventional technique, a brushless motor is used in general as a driving unit, and is precisely controlled by a controller.

DISCLOSURE OF INVENTION

Technical Problem

However, the conventional technique requires a camera to be mounted, and thus cannot be applied to a subminiature camera module. A drone which uses a subminiature lens has no gimbal capability.

According to the conventional technique, a gimbal is used by mounting a typical camera which is large, expensive, and heavy since a brushless motor is used. Therefore, a drone for flight must be large enough to allow stable flight and capturing.

In addition, a drone equipped with a small camera module currently does not have gimbal capability.

According to various embodiments of the present disclosure, high-quality image capturing such as image capturing using a large gimbal, a large camera, and a large drone is also possible when using a small drone which is inexpensive and light by integrating a small camera module and gimbal capability.

Solution to Problem

According to various embodiments of the present disclosure, a 3-axis gimbal may include: a first supporting body; a lens barrel including a lens group and coupled to the first supporting body in a rotatable manner about a first axis; a rolling driving unit mounted at a first position of the lens barrel to provide force for rotating the lens group about a second axis perpendicular to the first axis; a pitching driving unit mounted to the first supporting body to provide force for rotating the lens barrel about the first axis; a second supporting body coupled to the first supporting body in a rotatable manner about a third axis perpendicular each of to the first and second axes; and a yawing driving unit mounted to the second supporting body to allow the first supporting body to rotate about the third axis.

According to various embodiments of the present disclosure, a 3-axis gimbal may include: at least one supporting body; and a lens barrel mounted to the supporting body and coupled in a rotatable manner about each of three rotation axes. The lens barrel may include: a rotating member; and a rolling unit rotating about an optical axis on a surface of the rotating member. The rolling unit may include: a first rolling unit including first rollers disposed to a first side of the rotating member; and second rollers disposed to a second side directed opposite to the first side of the rotating member.

Advantageous Effects of Invention

A 3-axis camera gimbal according to various embodiments of the present disclosure is small and light, and thus can be mounted to an unmanned aerial vehicle such as a drone.

The 3-axis camera gimbal according to various embodiments of the present disclosure can minimize frictional resistance depending on a rotation motion using at least three rollers.

The 3-axis camera gimbals according to various embodiments of the present disclosure can implement a stable rolling motion of a lens unit by disposing at least three rollers to front and rear sides of respective rotating members.

The 3-axis camera gimbals according to various embodiments of the present disclosure can construct a Flexible Printed Circuit Board (FPCB) on a rotation axis depending on a movement of an FPCB inflection point.

The 3-axis camera gimbals according to various embodiments of the present disclosure can reduce the number of components and material cost by using one or more common gears in each of driving units (a rolling driving unit, a pitching driving unit, and a yawing driving unit).

BEST MODE FOR CARRYING OUT THE INVENTION

Figure 1:
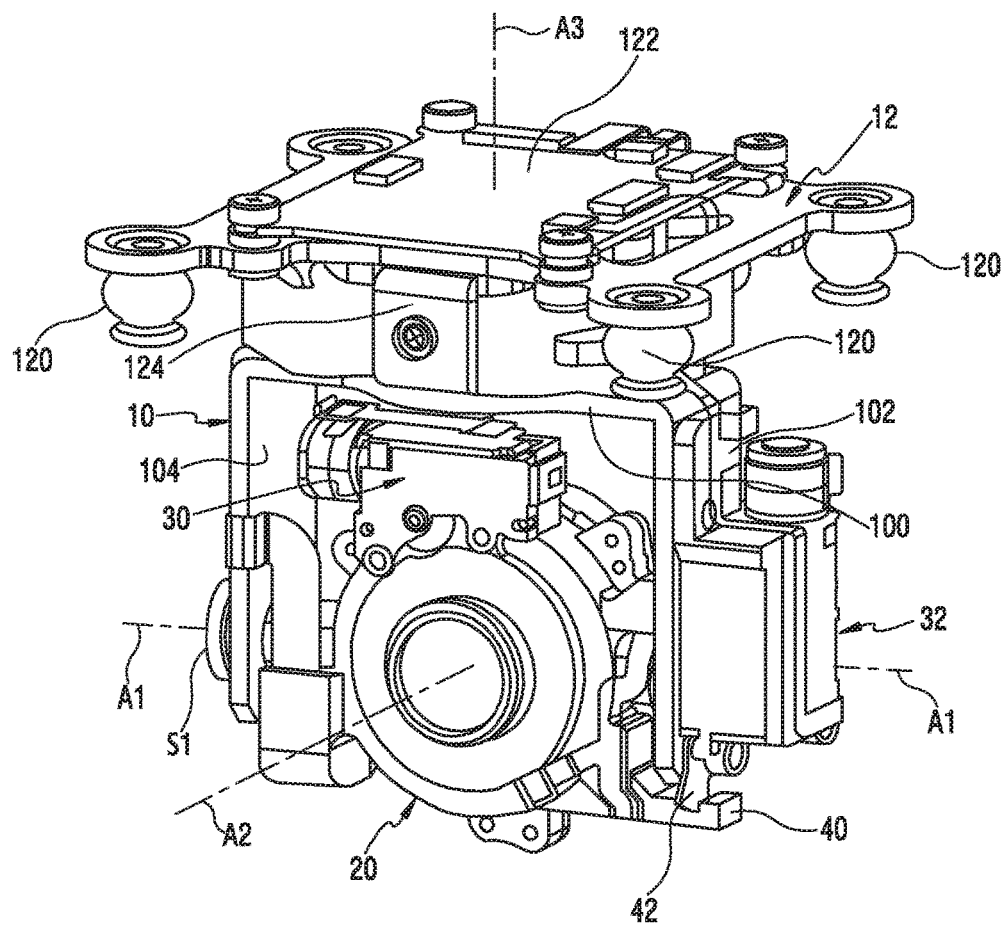
FIG. 1 is a perspective view illustrating a front side of a 3-axis camera gimbals according to various embodiments of the present disclosure.

Hereinafter, various embodiments of the present invention will be described with reference to accompanying drawings. However, various embodiments of the present invention are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present invention, but do not limit the elements. For example, such terms do not limit the order and/or priority of the elements. Furthermore, such terms may be used to distinguish one element from another element. For example, "a first user device" and "a second user device" indicate different user devices regardless of the order or priority. For example, without departing from the scope of the present invention, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present invention are used to describe specified embodiments of the present invention and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present invention. In some cases, even if terms are terms which are defined in the specification, they may not be interpreted to exclude embodiments of the present invention.

Hereinafter, various embodiments of the present disclosure will be described with reference to the accompanying drawings.

Figure 2:
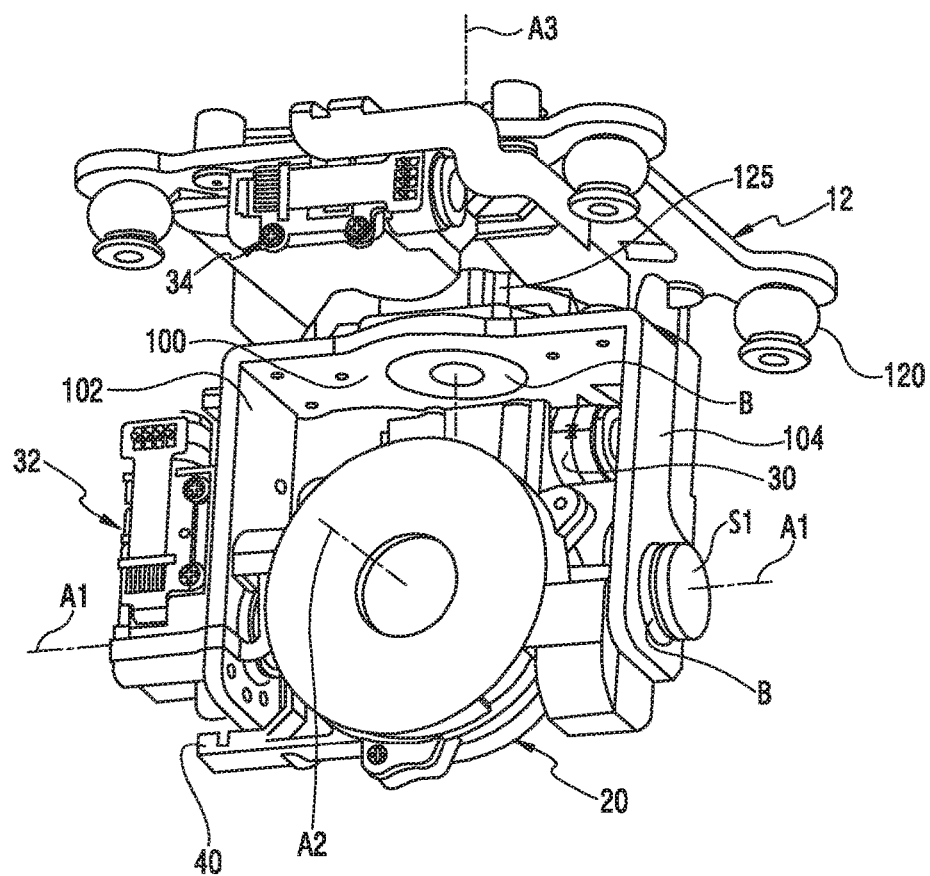
FIG. 2 is a perspective view illustrating a rear side of a 3-axis camera gimbals according to various embodiments of the present disclosure.

FIG. 1 is a perspective view illustrating a front side of a 3-axis camera gimbals according to various embodiments of the present disclosure. FIG. 2 is a perspective view illustrating a rear side of a 3-axis camera gimbals according to various embodiments of the present disclosure.

Referring to FIG. 1 and FIG. 2, a 3-axis camera gimbal (hereinafter, referred to as a gimbal) according to various embodiments may be an instrument mounted to an unmanned aerial vehicle such as a drone to maintain a horizontal posture of a camera lens. In particular, the gimbal according to various embodiments may be constructed to have a subminiature size and a lightweight so as to be mounted to a small-sized drone. In addition, the gimbal according to various embodiments is capable of precisely controlling an image capturing device such as a camera to maintain a horizontal posture of the camera along three axes.

The gimbal according to various embodiments may include a plurality of supporting bodies 10 and 12, a lens barrel 20, a rolling driving unit 30, a pitching driving unit 32, and a yawing driving unit 34. The driving unit may be referred to as a driving device, a driving module, a driving element, or the like. The gimbal may be referred to as a horizontal stabilizing device, a stabilizer, or the like.

The plurality of supporting bodies 10 and 12 according to various embodiments may be operable by safely mounting the driving units 30, 32, and 34, and may be mountable to an unmanned aerial vehicle such as a drone.

The supporting body according to various embodiments may include a first supporting body 10 and a second supporting body 12. The first supporting body 10 according to various embodiments may be constructed to have a curved shape, as a mounting member to which the rolling driving unit 30 (mounted to a lens barrel which is mounted to the first supporting body) and the pitching driving unit 32 are mounted. The first supporting body 10 may include a first frame 100 and second and third frames 102 and 104 extended orthogonally at both ends of the first frame 100. The first frame 100 may be disposed in a horizontal state, and the second and third frames 102 and 103 may be disposed in a vertical state.

A cross-section of the first supporting body 10 according to various embodiments may be constructed in a 'U' shape. The lens barrel 20 may be mounted to a space provided by the first, second, and third frames 100, 102 and 104, and the pitching driving unit 32 may be mounted to the second frame 102.

The second supporting body 12 according to various embodiments may be constructed to have a substantially plate shape, as a mounting member to which the yawing driving unit 34 is mounted. The second supporting body 12 may be coupled to the first supporting body 10 in a rotatable manner. The second supporting body 12 has fastening portions 120 disposed at four corners so as to be mountable to an unmanned aerial vehicle such as a drone. In addition, the second supporting body 12 may be a member to which a printed circuit board 122 is mounted. The second supporting body 12 may have a plurality of components mounted thereto, and thus may be referred to as a mount frame.

A reference numeral B refers to a bearing, and S1 refers to a pitching shaft.

Figure 3:
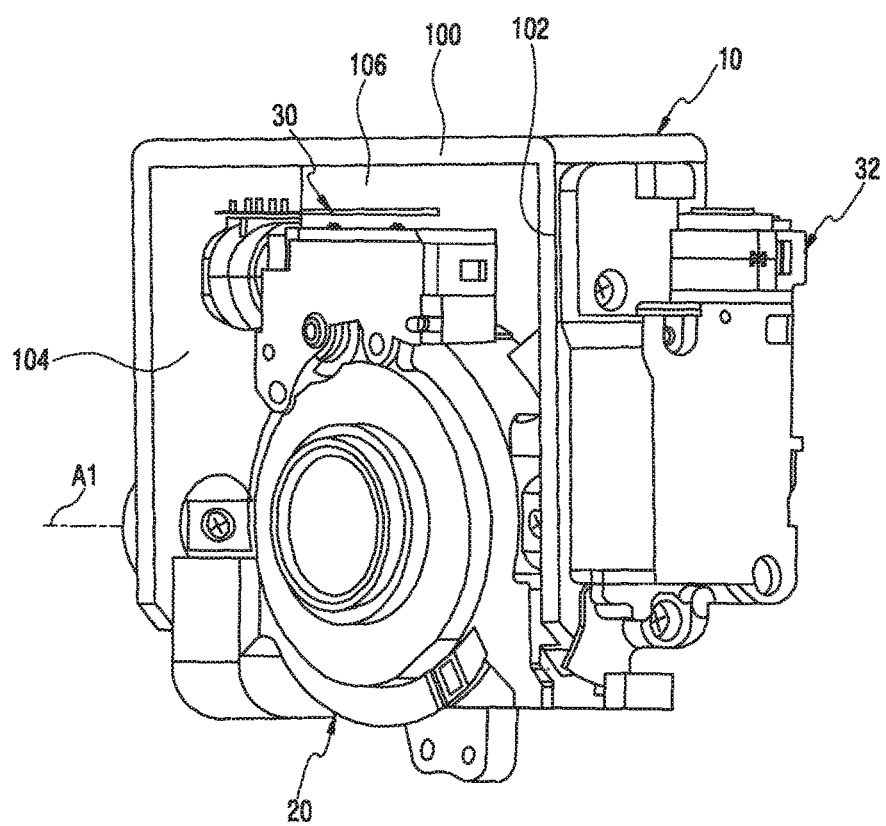
FIG. 3 is a perspective view illustrating a mounting state of a rolling driving unit, a pitching driving unit, and a lens barrel according to various embodiments of the present disclosure.
Figure 4:
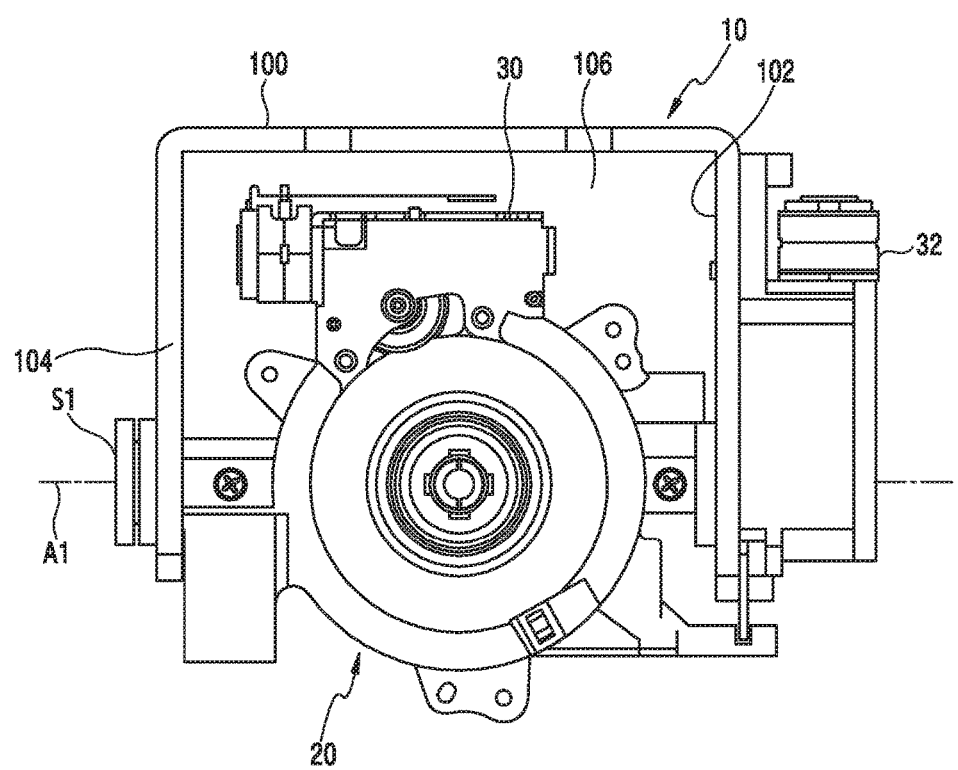
FIG. 4 is a front view of FIG. 3.

FIG. 3 is a perspective view illustrating a mounting state of a rolling driving unit, a pitching driving unit, and a lens barrel according to various embodiments of the present disclosure. FIG. 4 is a front view of FIG. 3.

Referring to FIG. 3 and FIG. 4, the lens barrel 20 according to various embodiments is mounted to the first supporting body 10, and in particular, may be coupled to a space 106 between the first, second, and third frames 100, 102, and 104 in a rotatable manner about a first axis A1. The lens barrel 20 may be coupled between the second and third frames 102 and 104 by a pitching shaft S1. The pitching shaft S1 may provide the first axis A1.

The rolling driving unit 30 according to various embodiments is mounted to a first position of the lens barrel 20 to provide driving force for rotating a lens group 232 (FIG. 10) accommodated in the lens barrel 20 about a second axis A2. The rolling driving unit 30 may be fixed to an outer circumferential surface of the lens barrel 20. For example, the rolling driving unit 30 may be mounted to the outer circumferential surface of the lens barrel 20 facing the first frame 100.

The pitching driving unit 32 according to various embodiments may be mounted to the second frame 102. The pitching driving unit 32 may be disposed to an outer side of the second frame 102 along a lengthwise direction so as to interlock with at least part of the lens barrel 20.

Figure 5A:
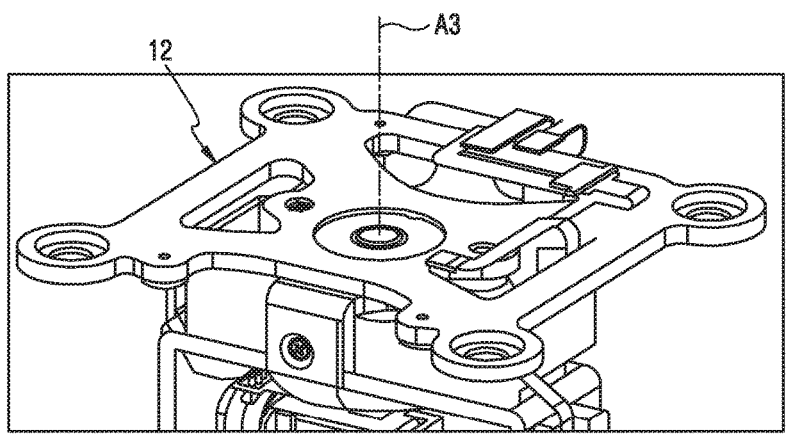
FIG. 5A is a perspective view illustrating a state in which a second supporting body having a yawing driving unit mounted thereto is viewed from above according to various embodiments of the present disclosure.
Figure 5B:
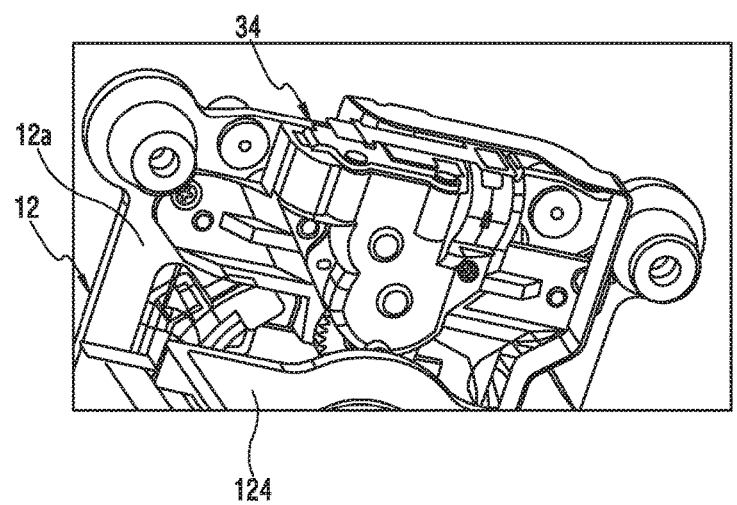
FIG. 5B is a perspective view illustrating a second supporting body having a yawing driving unit mounted thereto is viewed from below according to various embodiments of the present disclosure.

FIG. 5A is a perspective view illustrating a state in which a second supporting body having a yawing driving unit mounted thereto is viewed from above according to various embodiments of the present disclosure. FIG. 5B is a perspective view illustrating a second supporting body having a yawing driving unit mounted thereto is viewed from below according to various embodiments of the present disclosure.

Referring to FIG. 5A and FIG. 5B, a yawing driving unit 34 according to various embodiments may be mounted in parallel along a boundary of a lower side 12a of the second supporting body 12. The yawing driving unit 34 may be disposed between the second supporting body 12 and the first frame 100 (see FIG. 1 and FIG. 2) to provide rotational force of the first supporting body 10.

Referring back to FIG. 1 and FIG. 2, the gimbal according to various embodiments may provide a 3-axis rotation of the lens barrel 20. The lens barrel 20 is capable of performing a pitching motion about the first axis A1, capable of performing a rolling motion about a second axis A2, and capable of performing a yawing operation about a third axis A3. The second axis A2 may be an optical axis of a lens unit mounted to the lens barrel 20.

The first axis A1 and the second axis A2 may be directed perpendicular to each other, the second axis A2 and the third axis A3 may be directed perpendicular to each other, and the third axis A3 and the first and second axes A1 and A2 may be directed perpendicular to each other. In addition, the first axis A1 and the second axis A2 may be orthogonal to each other, the second axis A2 and the third axis A3 may be orthogonal to each other, and the third axis and the first and second axes A1 and A2 may be orthogonal to each other.

The second axis A2 according to various embodiments is an optical axis of a lens group accommodated in the lens barrel 20, and may correspond to a direction in which a center of the lens group is penetrated in a back and forth direction. The first axis A1 according to various embodiments may be parallel to the first frame 100 as a rotation axis of the lens barrel 20, and may be a rotation axis which traverses the second and third frames 102 and 104. The third axis A3 is a rotation axis of the first supporting body 10, and may correspond to a direction in which a center of the first frame 100 and a center of the second supporting body 12 are penetrated in an up and down direction.

The lens barrel 20 according to various embodiments may further include an initial position sensing unit to determine an initial position. The initial position sensing unit according to various embodiments may include an optical sensor 40 provided in the lens barrel 20 and an actuator 42 extended from the second frame 102 to operate the optical sensor 40. The optical sensor 40 may be integrally constructed in the lens barrel 20 and may rotate together with the lens barrel 20 about the first axis A1. The actuator 42 may exist between a light-receiving unit and a light-emitting unit or may exist outside a space between the light-receiving unit and the light-emitting unit according to a rotation of the optical sensor 40. The optical sensor 40 may recognize the initial position of the lens barrel 20 to output a sensed signal to a controller.

When power is initially supplied, if the actuator 42 covers the light-receiving unit, the initial position is detected by rotating in a direction not covering the light-receiving unit, and if the actuator 42 does not cover the light-receiving unit, the initial position may be detected by rotating in a direction covering the light-receiving unit.

Figure 6A:
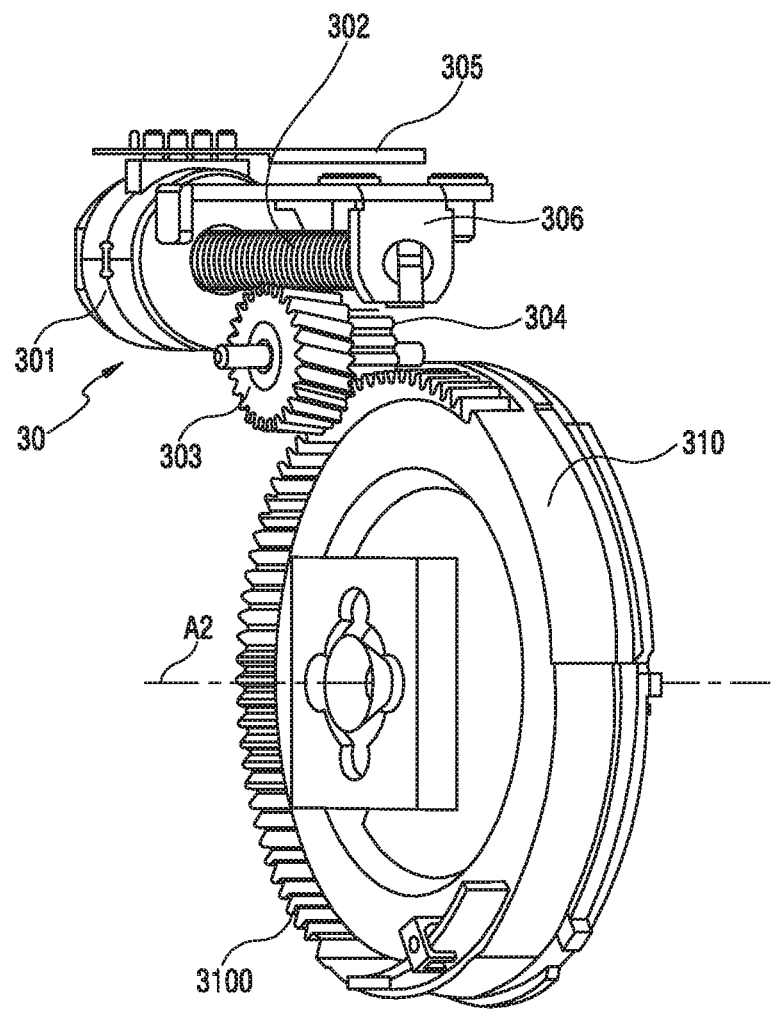
FIG. 6A is a perspective view illustrating a structure of a rolling driving unit employed in a 3-axis camera gimbal according to various embodiments of the present disclosure.
Figure 6B:
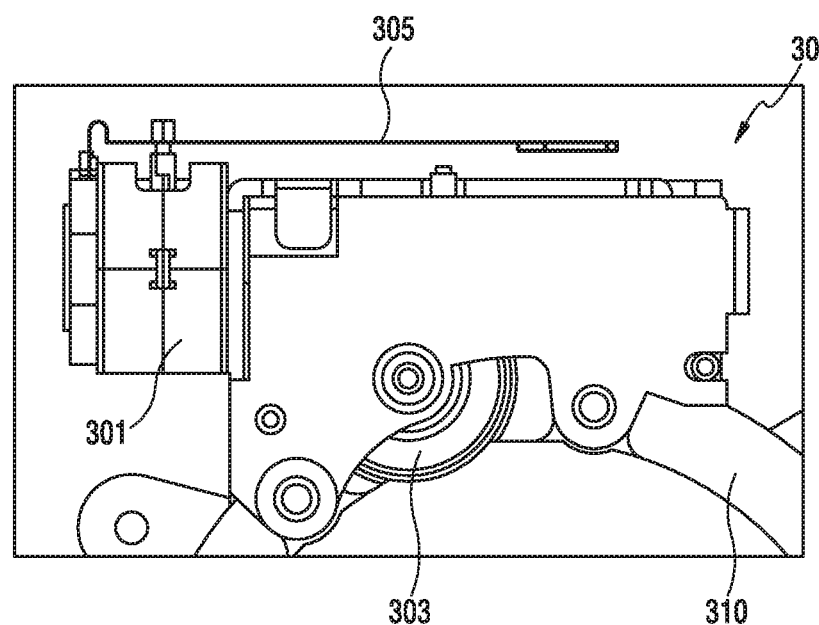
FIG. 6B is a perspective view illustrating an interlocking state of a rolling driving unit mounted to an outer circumferential surface of a lens barrel according to various embodiments of the present disclosure.

FIG. 6A is a perspective view illustrating a structure of a rolling driving unit employed in a 3-axis camera gimbal according to various embodiments of the present disclosure. FIG. 6B is a perspective view illustrating an interlocking state of a rolling driving unit mounted to an outer circumferential surface of a lens barrel according to various embodiments of the present disclosure.

Referring to FIG. 6A and FIG. 6B, the rolling driving unit 30 employed in the gimbal according to various embodiments may be a power unit for providing driving force capable of rolling an image sensor and lens group disposed to a lens barrel about the second axis A2. The rolling driving unit 30 according to various embodiments may include a driving motor 301 and a gear array. The driving motor 301 may be a motor that can be precisely controlled.

The gear array according to various embodiments may include a first gear 302 coupled to an axis of the driving motor 301, a second gear 303 engaged with the first gear 302, and a third gear 310 engaged with the second gear 303. The first gear 302 and the second gear 303 may be constructed of a worm gear. The third gear 310 may be a rotating member mounted to the lens barrel. Hereinafter, the third gear will be referred to as a rotating member.

The rotating member 310 according to various embodiments may be disposed to be engaged with the worm gear 303 by disposing a gear teeth 3100 at a predetermined distance on the outer circumferential surface thereof. When the driving motor 301 operates, the first gear 302 rotates, the second gears 303 and 304 disposed to be orthogonal to the first gear 302 rotate, and the second gear 304 delivers power to the rotating member 310. A reference numeral 305 may refer to an FPCB drawn out from the driving motor, and a reference numeral 306 may refer to an installation bracket.

Figure 7:
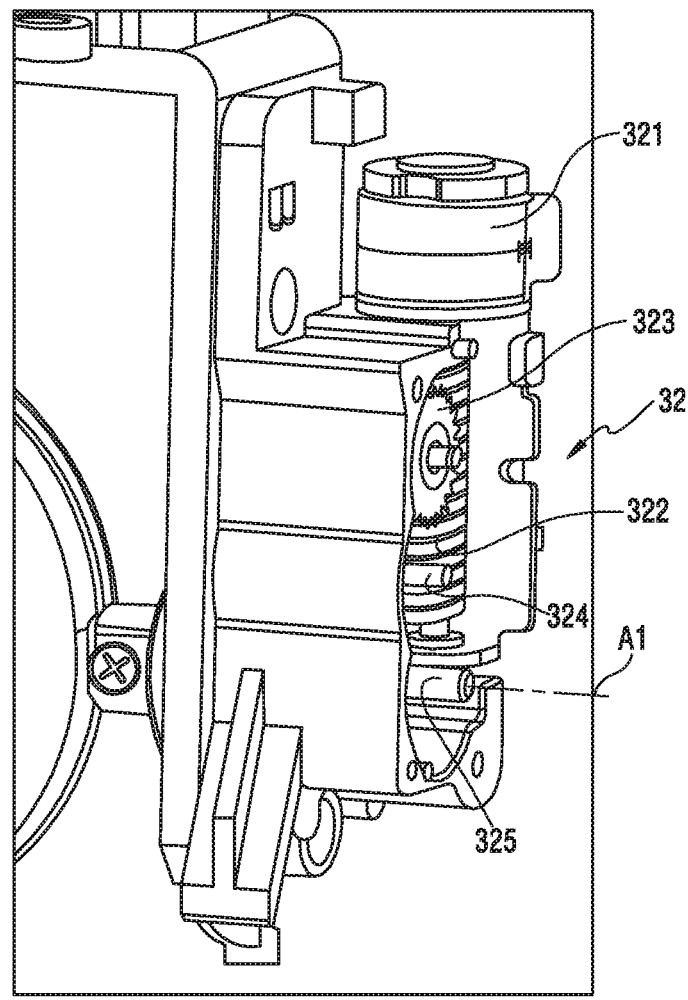
FIG. 7 is a perspective view illustrating a structure of a pitching driving unit employed in a 3-axis camera gimbal according to various embodiments of the present disclosure.

FIG. 7 is a perspective view illustrating a structure of a pitching driving unit employed in a 3-axis camera gimbal according to various embodiments of the present disclosure.

Referring to FIG. 7, the pitching driving unit 32 employed in the gimbal according to various embodiments may be erectly mounted along a lengthwise direction of the second frame 102. The pitching driving unit 32 may include a driving motor 321 and a gear array. The driving motor 321 may be a driving device that can be precisely controlled. The gear array may include a first gear 322 disposed coaxially with an axis of the driving motor 321 and a second gear 323 engaged vertically with the first gear 322. The first and second gears 322 and 323 may be defined as a well-known worm gear. The second gear 323 may be disposed to be engaged with another second gear 324, and the engaged second gear 324 may be disposed to be engaged with a third gear 325 which is integral with a rotation axis of the lens barrel. When the driving motor 321 is driven, rotational power is delivered to the third gear 325 via the first and second gears 322, 323, and 324, and thus the lens barrel can be pitched about the first axis A1. A rotation level of the driving motor 321 may be controlled by a controller (not shown).

Figure 8:
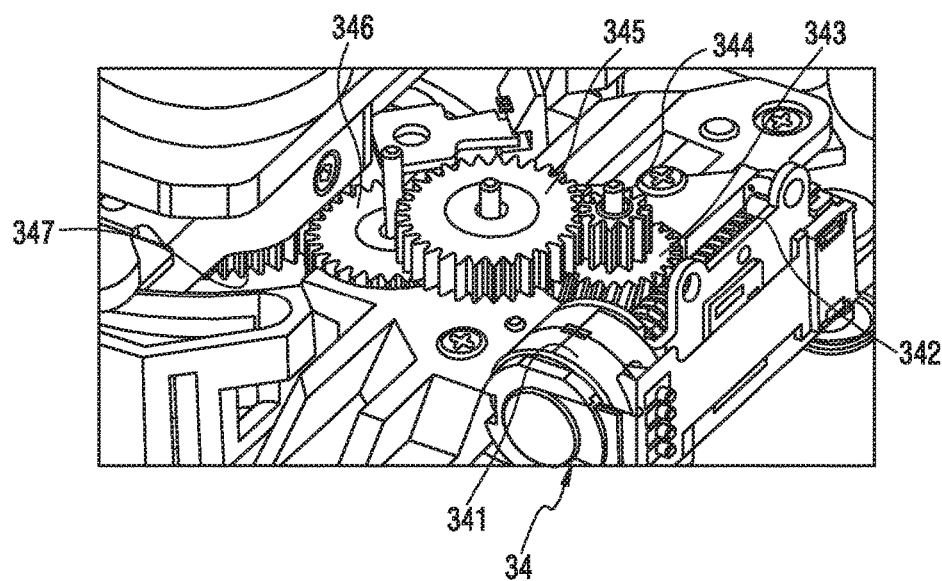
FIG. 8 is a perspective view illustrating a structure of a yawing driving unit employed in a 3-axis camera gimbal according to various embodiments of the present disclosure.

FIG. 8 is a perspective view illustrating a structure of a yawing driving unit employed in a 3-axis camera gimbal according to various embodiments of the present disclosure.

Referring to FIG. 8, the yawing driving unit 34 employed in the gimbal according to various embodiments may be mounted substantially in parallel to a lower side of a second supporting body. The yawing driving unit 34 according to various embodiments may include a driving motor 341 and a gear array. The driving motor 341 may be a driving device that can be precisely controlled. The gear array may include a first gear 342 disposed coaxially with an axis of the driving motor 341 and a second gear 343 engaged vertically with the first gear 342. The first and second gears 342 and 343 may be defined as a well-known worm gear. The second gear may include a plurality of gear arrays 344 and 345. A last second gear 346 may be disposed to be engaged with a third gear 347 which is integral with a rotation axis of a yawing shaft. When the driving motor 341 is driven, rotational power is delivered to the third gear 347 via the first and second gears 342, 343, 344, 345, and 346, and thus the lens barrel can be pitched about a third axis. A rotation level of the driving motor may be controlled by a controller (not shown).

Figure 9:
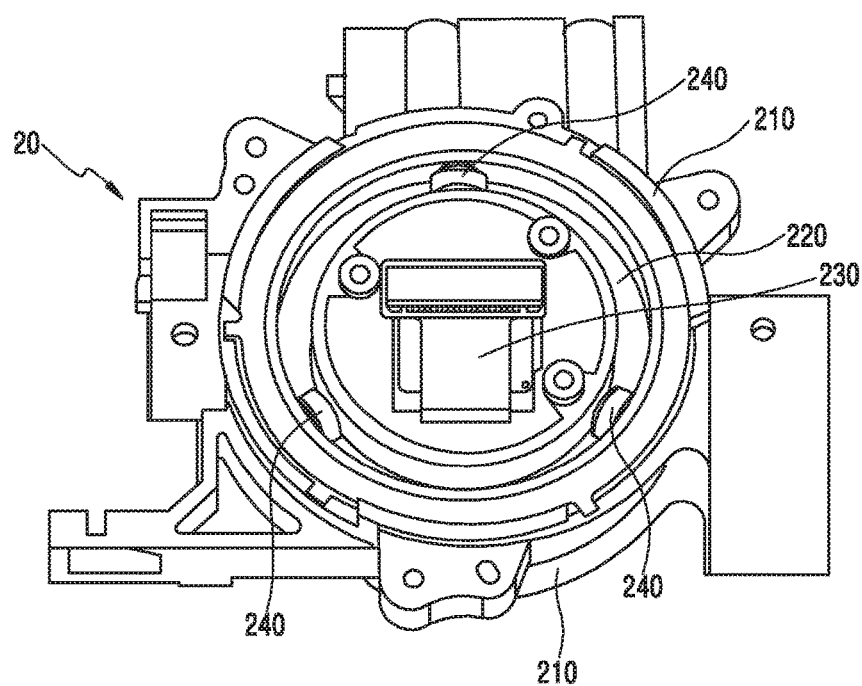
FIG. 9 is a perspective view illustrating a mounting state of a rolling unit disposed to a lens barrel according to various embodiments of the present disclosure.
Figure 10:
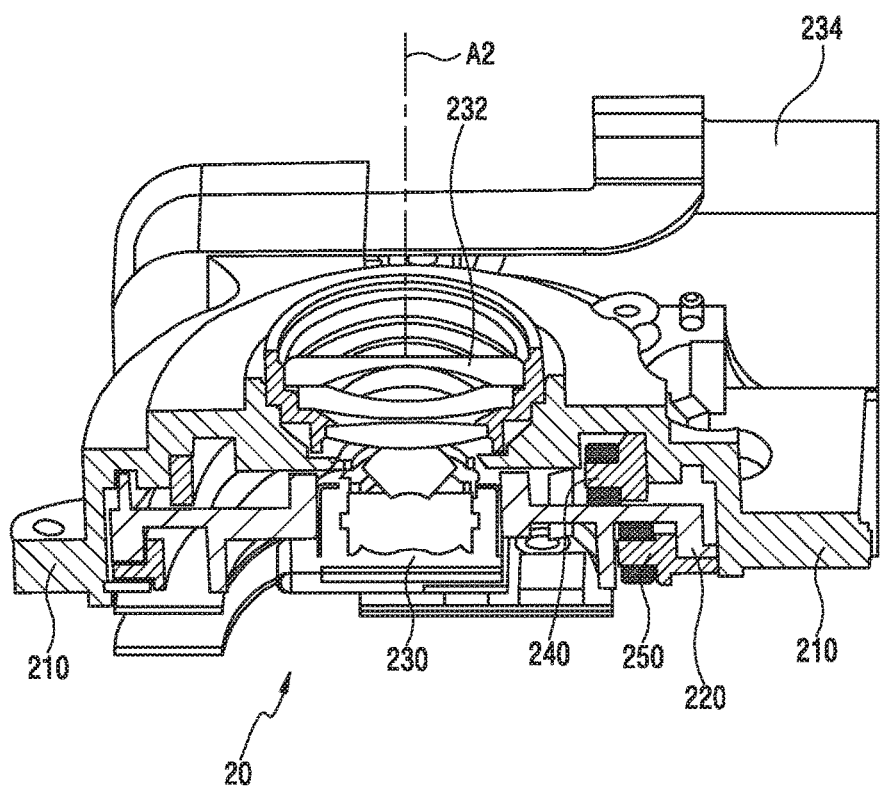
FIG. 10 is a cross-sectional perspective view illustrating a lens barrel according to various embodiments of the present disclosure.

FIG. 9 is a perspective view illustrating a mounting state of a rolling unit disposed to a lens barrel according to various embodiments of the present disclosure. FIG. 10 is a cross-sectional perspective view illustrating a lens barrel according to various embodiments of the present disclosure.

Referring to FIG. 9 and FIG. 10, the lens barrel 20 according to various embodiments may include a housing 210, an image sensor 230, a lens group 232, a rotating member 220, and rolling units 240 and 250. The lens barrel 20 is an image capturing device functioning as a camera, and may have an optical axis.

The housing 210 according to various embodiments may be a substantially cylindrical housing capable of accommodating the image sensor 230, the lens group 232, the rotating member 220, and the rolling units 240 and 250. A lens may be exposed to a front side of the housing, and a back cover may be coupled to a back side thereof.

The image sensor 230 according to various embodiments may be disposed to face the lens group 232 by being spaced apart therefrom, as an image capturing element for generating an image by converting an optical signal into an electrical signal.

The lens group 232 according to various embodiments may include a plurality of lenses disposed along an optical axis.

The rotating member 220 according to various embodiments may be fixedly mounted to the image sensor 230 and the lens group 232, as a member which rotates about a second axis in the housing 210 by means of the rolling driving unit. The image sensor 230 and the lens group 232 are fixed to the rotating member 220 to rotate together with the rotating member 220.

The rotating member 220 according to various embodiments may have a shape having a first side facing a first direction, a second side facing a second direction opposite to the direction of the first side, and a lateral side provided by the first and second sides. The first direction may be a forward direction, and the second direction may be a backward direction. The rotating member 220 may include a track or rail on which a rolling unit rolls.

The rolling units 240 and 250 according to various embodiments may be mounted between the housing 210 and the rotating member 220, and may be installed to minimize friction when the rotating member 220 rotates. The rolling unit may include a first rolling unit 240 disposed to the first side of the rotating member 220 and the second rolling unit 250 disposed to the second side. The first and second rolling units 240 and 250 may be disposed respectively to the first and second sides of the rotating member 220 to minimize the friction. The first rolling unit 240 may include at least three first rollers. The second rolling unit 250 may include at least three second rollers. The first rollers may be equally spaced on the first side of the rotating member 220 to perform a rolling motion on the first side. The second rollers are equally spaced on the second side of the rotatable member 220 to perform a rolling motion on the second side.

Figure 11:
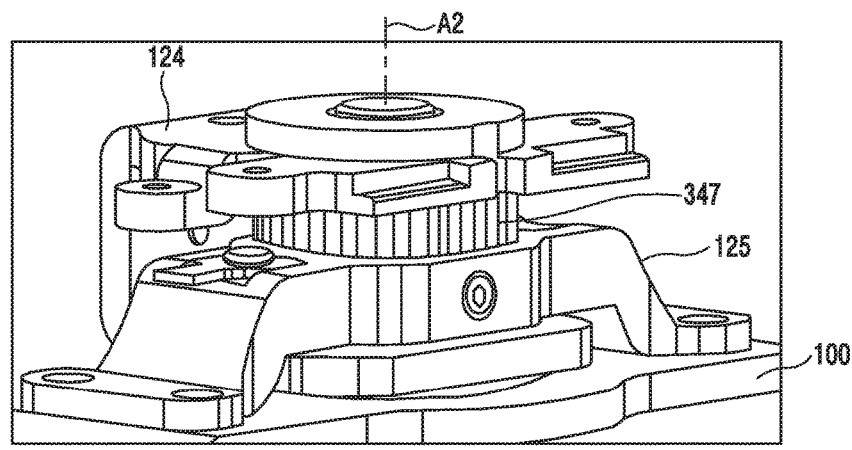
FIG. 11 is a perspective view illustrating a coupling state of a first supporting body according to various embodiments of the present disclosure.
Figure 12:
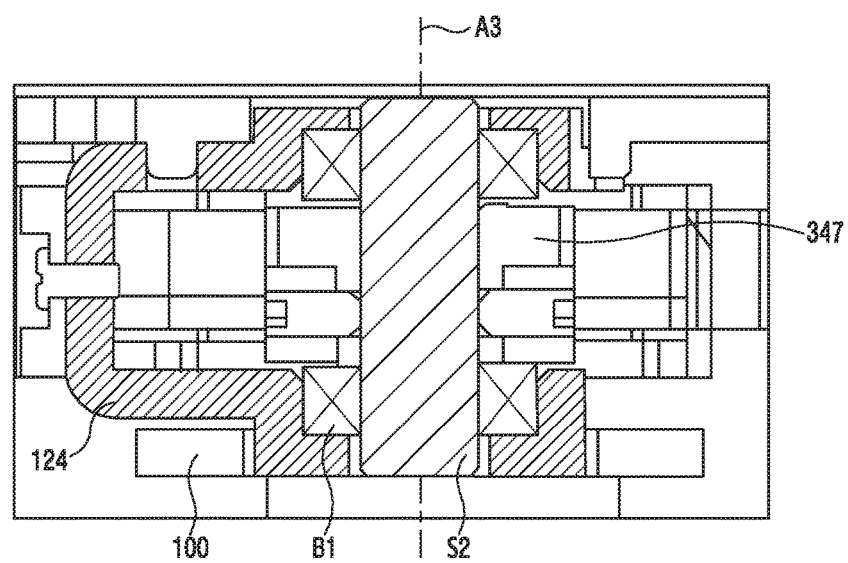
FIG. 12 is a cross-sectional view illustrating a coupling state of a first supporting body according to various embodiments of the present disclosure.

FIG. 11 is a perspective view illustrating a coupling state of a first supporting body according to various embodiments of the present disclosure. FIG. 12 is a cross-sectional view illustrating a coupling state of a first supporting body according to various embodiments of the present disclosure.

Referring to FIG. 11 and FIG. 12, a coupling structure of the first supporting body 10 according to various embodiments will be described below.

The coupling structure according to various embodiments may include a coupling construction between a first frame 100, a fixed frame 125, a rotation frame 124, a gear 347 and a yawing shaft S1.

In the coupling structure according to various embodiments, with respect to a yawing shaft S2 which provides the third axis A3, a bearing B1 may be disposed between the rotation frame 124 and the yawing shaft S2. In addition, the gear 347 may be pressed into the yawing shaft S2, so as to be disposed between an upper bearing and a lower bearing.

The fixed frame 125 according to various embodiments may be integrally fastened to an upper central side of the first frame 100 by using a fastener such as a screw. In addition, the fixed frame 125 may be fixed integrally with the gear 347. The gear 347, the fixed frame 125, and the first frame 100 may rotate together about the third axis A3. The gear 347 may be the same gear as the gear 347 of FIG. 8.

When a driving motor of the yawing driving unit operates to rotate the gear 347, the fixed frame 125 and the first frame 100 may perform a rotation motion together.

According to various embodiments of the present disclosure, a 3-axis gimbal may include: a first supporting body; a lens barrel including a lens group and coupled to the first supporting body in a rotatable manner about a first axis; a rolling driving unit mounted at a first position of the lens barrel to provide force for rotating the lens group about a second axis perpendicular to the first axis; a pitching driving unit mounted to the first supporting body to provide force for rotating the lens barrel about the first axis; a second supporting body coupled to the first supporting body in a rotatable manner about a third axis perpendicular each of to the first and second axes; and a yawing driving unit mounted to the second supporting body to allow the first supporting body to rotate about the third axis.

According to various embodiments of the present disclosure, the second supporting body may be mounted to an unmanned aerial vehicle by using a plurality of fastening portions.

According to various embodiments of the present disclosure, the first supporting body may have a curved shape of which a cross-section has a 'U' shape, and may include: a first frame; and second and third frames extended orthogonally at both ends of the first frame. The second supporting body may include a mount frame disposed horizontally on the first frame and mounted in a rotatable manner about the third axis.

According to various embodiments of the present disclosure, the first axis may be parallel to the first frame and may face a direction traversing between the second and third frames. The third axis may face a center of the first frame in an up and down direction. The second axis may penetrate a center of an optical axis of the lens barrel.

According to various embodiments of the present disclosure, the lens barrel may include: a housing; and a rotating member disposed in a rotatable manner in the housing.

According to various embodiments of the present disclosure, the lens barrel may include: an image sensor mounted to the rotating member; and a lens group facing the image sensor. The image sensor and the lens group may rotate together on the rotating member about the first axis.

According to various embodiments of the present disclosure, the lens barrel may include at least one rolling unit.

According to various embodiments of the present disclosure, the rolling unit may include: a first rolling unit including at least three first rollers disposed to a first side of the rotating member; and a second rolling unit including at least three second rollers disposed to a second side directed opposite to the first side of the rotating member.

According to various embodiments of the present disclosure, each of the rolling driving unit, the pitching driving unit, and the yawing driving unit may include a plurality of driving motors and a plurality of gear arrays respectively engaged with the driving motors. Each of the gear arrays may include a same-shaped worm gear.

According to various embodiments of the present disclosure, in the second supporting body, a main printed circuit board may be fixed thereto. An electric connection may be achieved between the image sensor and the main printed circuit board by using a flexible printed circuit board. The flexible printed circuit board may be disposed such that an inflection point varies.

According to various embodiments of the present disclosure, the lens barrel further may include an initial position sensing unit.

According to various embodiments of the present disclosure, the initial position sensing unit may include: a sensor disposed to the lens barrel; and an actuator disposed to the second frame to operate the sensor.

According to various embodiments of the present disclosure, the sensor may be disposed to a lower outer circumferential portion of the lens barrel. The actuator may be extended from an end portion of the second frame in a direction of the sensor.

According to various embodiments of the present disclosure, a 3-axis gimbal may include: at least one supporting body; and a lens barrel mounted to the supporting body and coupled in a rotatable manner about each of three rotation axes. The lens barrel may include: a rotating member; and a rolling unit rotating about an optical axis on a surface of the rotating member. The rolling unit may include: a first rolling unit including first rollers disposed to a first side of the rotating member; and second rollers disposed to a second side directed opposite to the first side of the rotating member.

According to various embodiments of the present disclosure, each of the first and second rolling units may include at least three rollers.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present invention may be, for example, implemented as instructions stored in a computer-readable storage medium in a form of a programming module. In case that the instruction is executed by a processor (e.g., processor 120), and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present invention, and vice versa.

The module or programming module according to the present invention may include at least one or more of the aforementioned constituent elements, or omit some of the aforementioned constituent elements, or further include additional other constituent elements. Operations carried out by the module, the programming module or the other constituent elements according to the present invention may be executed in a sequential, parallel, repeated or heuristic method. Also, some operations may be executed in different order or may be omitted, or other operations may be added.

Embodiments disclosed in the present invention are suggested for easy explanation and understanding of the technical features disclosed herein and are not intended to limit the scope of various embodiments of the present invention. Therefore, the scope of various embodiments of the present invention should be interpreted as including all changes based on the technical idea of various embodiments of the present invention or various other embodiments.

What is claimed is:

1. A 3-axis gimbal comprising:
   a first supporting body;
   a lens barrel comprising a lens group and coupled to the first supporting body in a rotatable manner about a first axis;
   a rolling driving unit mounted at a first position of the lens barrel to provide force for rotating the lens group about a second axis perpendicular to the first axis;
   a pitching driving unit mounted to the first supporting body to provide a force for rotating the lens barrel about the first axis;
   a second supporting body coupled to the first supporting body in a rotatable manner about a third axis perpendicular each of to the first and second axes; and
   a yawing driving unit mounted to the second supporting body to allow the first supporting body to rotate about the third axis,
   wherein the lens barrel comprises a housing, and a rotating member disposed in a rotatable manner in the housing,
   wherein the lens barrel comprises:
      an image sensor mounted to the rotating member, and
      a lens group facing the image sensor,
   wherein the image sensor and the lens group rotate together on the rotating member about the first axis, and
   wherein the lens barrel comprises at least one rolling unit.

2. The gimbal of claim 1, wherein the second supporting body is mounted to an unmanned aerial vehicle by using a plurality of fastening portions.

3. The gimbal of claim 1,
   wherein the first supporting body has a curved shape of which a cross-section has a IF shape, and comprises:
      a first frame, and
      second and third frames extended orthogonally at both ends of the first frame, and
   wherein the second supporting body comprises a mount frame disposed horizontally on the first frame and mounted in a rotatable manner about the third axis.

4. The gimbal of claim 3, wherein the first axis is parallel to the first frame and faces a direction traversing between the second and third frames, the third axis faces a center of the first frame in an up and down direction, and the second axis penetrates a center of an optical axis of the lens barrel.

5. The gimbal of claim 3, wherein the lens barrel further comprises an initial position sensing unit.

6. The gimbal of claim 5, wherein the initial position sensing unit comprises:
   a sensor disposed to the lens barrel; and
   an actuator disposed to the second frame to operate the sensor.

7. The gimbal of claim 6, wherein the sensor is disposed to a lower outer circumferential portion of the lens barrel, and the actuator is extended from an end portion of the second frame in a direction of the sensor.

8. The gimbal of claim 1, wherein the at least one rolling unit comprises:
   a first rolling unit comprising at least three first rollers disposed on a first side of the rotating member; and
   a second rolling unit comprising at least three second rollers disposed on a second side of the rotating member directly opposite to the first side of the rotating member.

9. The gimbal of claim 1, wherein each of the rolling driving unit, the pitching driving unit, and the yawing driving unit comprises a plurality of driving motors and a plurality of gear arrays respectively engaged with the driving motors, and each of the gear arrays comprises a same-shaped worm gear.

10. The gimbal of claim 1, wherein in the second supporting body, a main printed circuit board is fixed thereto, an electric connection is achieved between the image sensor and the main printed circuit board by using a flexible printed circuit board, and the flexible printed circuit board is disposed such that an inflection point varies.

11. A 3-axis gimbal comprising:
    at least one supporting body; and
    a lens barrel mounted to the at least one supporting body in a rotatable manner about each of three rotation axes,
    wherein the lens barrel comprises:
       a rotating member, and
       a rolling unit for rotating about an optical axis on a surface of the rotating member, and
    wherein the rolling unit comprises:
       a first rolling unit comprising a plurality of first rollers disposed to a first side of the rotating member, and
       a second rolling unit comprising a plurality of second rollers disposed to a second side of the rotating member directly opposite to the first side of the rotating member.

12. The 3-axis gimbal of claim 11, wherein each of the first and second rolling units comprises at least three rollers.

* * * * *